United States Patent
Karnezos et al.

(10) Patent No.: US 12,317,906 B2
(45) Date of Patent: Jun. 3, 2025

(54) FEED COMPOSITIONS AND METHODS FOR INHIBITING FOCAL ULCERATIVE DERMATITIS

(71) Applicant: Purina Animal Nutrition LLC, Arden Hills, MN (US)

(72) Inventors: Theodore Karnezos, Colchester, VT (US); Diana Ayala, Ballwin, MO (US); Daniel Grum, Labadie, MO (US); Benjamin R. Trible, New Haven, MO (US); Nicholas Evans, Harrisonburg, VA (US); Emily Kimminau, Williamsburg, VA (US); Joseph Dart, Brussels, WI (US)

(73) Assignee: Purina Animal Nutrition LLC, Arden Hills, MN (US)

( * ) Notice: Subject to any disclaimer, the term of this patent is extended or adjusted under 35 U.S.C. 154(b) by 132 days.

(21) Appl. No.: 17/546,193

(22) Filed: Dec. 9, 2021

(65) Prior Publication Data

US 2022/0174984 A1   Jun. 9, 2022

Related U.S. Application Data

(60) Provisional application No. 63/123,288, filed on Dec. 9, 2020.

(51) Int. Cl.
*A23K 10/18* (2016.01)
*A23K 50/75* (2016.01)

(52) U.S. Cl.
CPC .............. *A23K 10/18* (2016.05); *A23K 50/75* (2016.05)

(58) Field of Classification Search
CPC .............................. A23K 10/18; A23K 50/75
See application file for complete search history.

(56) References Cited

U.S. PATENT DOCUMENTS

| 2,125,398 A | 8/1938 | Reichert et al. |
| 4,378,376 A | 3/1983 | Wagner et al. |
| (Continued) | | |

FOREIGN PATENT DOCUMENTS

| CA | 2323581 A1 | 10/1999 |
| CA | 3109447 A1 | 3/2020 |
| (Continued) | | |

OTHER PUBLICATIONS

Gingerich (The Current State of Pullet and Layer Health Status in the U.S, 2019, https://midwestpoultry.com/wp-content/uploads/2020/08/Gingerich-Eric.pdf) (Year: 2019).*

(Continued)

*Primary Examiner* — Changqing Li
*Assistant Examiner* — Carrie Glimm
(74) *Attorney, Agent, or Firm* — Dorsey & Whitney LLP

(57) ABSTRACT

The present disclosure describes animal feed products formulated to inhibit focal ulcerative dermatitis, and methods of feeding such products to the animals. Feeding methods involve providing poultry with a feed product that includes a base feed and a direct-fed microbial composition. The direct-fed microbial composition includes one or more strains of *Bacillus pumilus*. The poultry can include cage-free layer hens at risk of developing, or already diagnosed with, focal ulcerative dermatitis. Inhibition of focal ulcerative dermatitis can increase the egg production of the layer hens relative to layer hens fed the same base feed but lacking the direct-fed microbial composition.

14 Claims, 6 Drawing Sheets

*100*

*102*

Feeding cage-free poultry a feed product comprising a base feed and a direct-fed microbial composition comprising one or more strains of *Bacillus pumilus* in an amount effective to inhibit focal ulcerative dermatitis

(56) References Cited

U.S. PATENT DOCUMENTS

| | | | |
|---|---|---|---|
| 4,617,190 A | 10/1986 | Montgomery | |
| 4,961,934 A | 10/1990 | Iwasaki et al. | |
| 5,085,873 A | 2/1992 | Degre | |
| 5,580,592 A | 12/1996 | Nassauer et al. | |
| 5,607,681 A | 3/1997 | Galley et al. | |
| 5,668,299 A | 9/1997 | Debonte et al. | |
| 5,681,856 A | 10/1997 | Brinton | |
| 5,747,078 A | 5/1998 | De et al. | |
| 5,756,132 A | 5/1998 | Rebhan | |
| 5,785,990 A | 7/1998 | Langrehr | |
| 5,792,501 A | 8/1998 | Lepine | |
| 5,795,602 A | 8/1998 | Craig et al. | |
| 5,830,511 A | 11/1998 | Mullerat et al. | |
| 5,861,187 A | 1/1999 | Debonte et al. | |
| 5,962,062 A | 10/1999 | Carrie et al. | |
| 6,348,223 B1 | 2/2002 | Claycamp et al. | |
| 6,365,152 B1 | 4/2002 | Mckinney | |
| 6,500,426 B1 | 12/2002 | Barendse et al. | |
| 6,541,047 B1 | 4/2003 | Claycamp et al. | |
| 6,562,340 B1 | 5/2003 | Bedford et al. | |
| 7,247,299 B2 | 7/2007 | Lin et al. | |
| 7,384,628 B2 | 6/2008 | Rehberger et al. | |
| 7,709,033 B2 | 5/2010 | Kvist et al. | |
| RE43,929 E | 1/2013 | Miller et al. | |
| 8,349,313 B2 | 1/2013 | Smith et al. | |
| 8,540,981 B1 | 9/2013 | Wehnes et al. | |
| 8,603,551 B1 | 12/2013 | Novak et al. | |
| 9,113,642 B2 | 8/2015 | Kanbe et al. | |
| 9,179,693 B2 | 11/2015 | Romero et al. | |
| 11,101,549 B2 | 8/2021 | Baek et al. | |
| 2002/0018828 A1 | 2/2002 | Lepine | |
| 2002/0048607 A1 | 4/2002 | Muscato et al. | |
| 2002/0119136 A1 | 8/2002 | Johansen | |
| 2005/0106163 A1 | 5/2005 | David et al. | |
| 2005/0171367 A1 | 8/2005 | Deloach | |
| 2006/0159728 A1 | 7/2006 | Miller | |
| 2006/0289354 A1 | 12/2006 | Zhou et al. | |
| 2007/0036850 A1 | 2/2007 | Roehrich et al. | |
| 2007/0134369 A1 | 6/2007 | Mazeris | |
| 2007/0203802 A1 | 8/2007 | Medo et al. | |
| 2007/0209599 A1 | 9/2007 | Block et al. | |
| 2008/0026036 A1 | 1/2008 | Miller et al. | |
| 2008/0026101 A1 | 1/2008 | Nickel et al. | |
| 2008/0057047 A1 | 3/2008 | Sas et al. | |
| 2008/0118615 A1 | 5/2008 | Hartmann et al. | |
| 2009/0253790 A1 | 10/2009 | Smith et al. | |
| 2009/0280090 A1 | 11/2009 | Rehberger et al. | |
| 2009/0317378 A1 | 12/2009 | Perraudin | |
| 2010/0092428 A1 | 4/2010 | Schmidt et al. | |
| 2010/0221386 A1 | 9/2010 | Buysse et al. | |
| 2011/0201081 A1 | 8/2011 | Kensch et al. | |
| 2011/0229598 A1 | 9/2011 | Musser | |
| 2012/0321592 A1 | 12/2012 | Schmidt et al. | |
| 2013/0064927 A1 | 3/2013 | Davis et al. | |
| 2013/0280369 A1 | 10/2013 | Miller | |
| 2013/0330308 A1 | 12/2013 | Millan et al. | |
| 2014/0147548 A1 | 5/2014 | Miller et al. | |
| 2014/0336271 A1 | 11/2014 | Moore et al. | |
| 2015/0374740 A1 | 12/2015 | Forsberg et al. | |
| 2016/0205970 A1 | 7/2016 | Bruggeman et al. | |
| 2016/0213029 A1 | 7/2016 | Bruggeman et al. | |
| 2016/0250239 A1 | 9/2016 | Bruggeman et al. | |
| 2016/0280778 A1 | 9/2016 | Cook et al. | |
| 2017/0202928 A1 | 7/2017 | Miller et al. | |
| 2017/0231254 A1 | 8/2017 | Miller | |
| 2017/0258111 A1 | 9/2017 | Galbraith et al. | |
| 2018/0185425 A1 | 7/2018 | Caldwell et al. | |
| 2018/0228181 A1 | 8/2018 | Rodríguez Villamizar et al. | |
| 2019/0289878 A1 | 9/2019 | Miller et al. | |
| 2020/0276279 A1 | 9/2020 | Millan et al. | |

FOREIGN PATENT DOCUMENTS

| | | | |
|---|---|---|---|
| CN | 101049116 A | 10/2007 | |
| CN | 101703171 A | 5/2010 | |
| CN | 101911981 A | 12/2010 | |
| CN | 102132766 A | 7/2011 | |
| CN | 102805263 A | 12/2012 | |
| CN | 103271091 A | 9/2013 | |
| CN | 104621047 A | 5/2015 | |
| CN | 106260523 A | 1/2017 | |
| EP | 0229938 A1 | 7/1987 | |
| EP | 0282663 B1 | 12/1991 | |
| EP | 0642740 B1 | 3/1995 | |
| EP | 1637880 A1 | 3/2006 | |
| EP | 1815754 A1 | 8/2007 | |
| JP | 2509932 Y2 | 2/1990 | |
| JP | H0789863 | 10/1995 | |
| JP | 3145829 U | 3/2001 | |
| JP | 2002544212 A | 12/2002 | |
| JP | 2004236552 A | 8/2004 | |
| KR | 20100101091 A | 9/2010 | |
| WO | WO-9411492 A1 * | 5/1994 | ............ A23K 1/009 |
| WO | 9949740 A1 | 10/1999 | |
| WO | 0069267 A1 | 11/2000 | |
| WO | 02056879 A1 | 7/2002 | |
| WO | 2007015937 A1 | 2/2007 | |
| WO | 2007064741 A2 | 6/2007 | |
| WO | 2007106452 A2 | 9/2007 | |
| WO | 2010033714 A1 | 3/2010 | |
| WO | 2011055387 A2 | 5/2011 | |
| WO | 2011061756 A2 | 5/2011 | |
| WO | 2011115306 A1 | 9/2011 | |
| WO | 2012110777 A2 | 8/2012 | |
| WO | 2014020141 A1 | 2/2014 | |
| WO | 2015160818 A1 | 10/2015 | |
| WO | 2016060934 A1 | 4/2016 | |
| WO | 2016118840 A1 | 7/2016 | |
| WO | WO-2017001701 A1 * | 1/2017 | ............ A23K 10/14 |
| WO | 2017025772 A1 | 2/2017 | |
| WO | 2019079629 A1 | 4/2019 | |
| WO | 2022125734 | 6/2022 | |

OTHER PUBLICATIONS

Stuttgen (Life Cycle of a Laying Hen, https://livestock.extension.wisc.edu/articles/life-cycle-of-a-laying-hen/.) (Year: 2023).*

Yan (Feifei Yan. The effects of dietary probiotic inclusion on skeletal health of poultry and its possible mechanisms. PhD Thesis. West Lafayette, Indiana. Purdue University. 2016. https://docs.lib.purdue.edu/open_access_dissertations/1033). (Year: 2016).*

Environmental Protection Agency (EPA, Fecal Coliform and E. coli, 2016, https://archive.epa.gov/katrina/web/html/fecal.html). (Year : 2016).*

International Search Report and Written Opinion issued in International Application No. PCT/US2021/062533, mailed on Mar. 10, 2022, 12 pages.

Huynh, et al., "Ulcerative Dermatitis and Valvular Endocarditis Associated with Staphylococcus aureus in a Hyacinth Macaw", Avian Dis, vol. 58, No. 2, pp. 223-227, Jun. 2014.

PCT International Search Report mailed Jun. 25, 2019 in PCT Application No. PCT/US2019/023641.

PCT Written Opinion mailed Jun. 25, 2019 in PCT Application No. PCT/US2019/023641.

"Jersey Blend—Cow's match—Calf growth formula", Jan. 1, 2004 (Jan. 1, 2004 ), Mar. 2013, (Mar. 2013), XP55194288, Retrieved from the Internet:URL:http://www.lolmilkreplacer.com/stellen/groups/public/documents/web_content/ecmp2-0186429.pdf, 2 pages.

"Manual on the Use of the LP-System in Milk Handling and Preservation", 1999, 4 pages.

"mM vs ppm", retrieved from Internet, Jun. 2016, 2 pages.

"Nursing Formula Select", Available online at www.masterfeeds.com on Sep. 2, 2011, 3 pages.

Agazzi, et al., "Effects of species-specific probiotic addition to milk replacer on calf health and performance during the first month of life", Ann. Anim. Sci., vol. 14, No. 1, 2014, 101-115.

Barabas, "An alternative method of milk treatment", http://www.fao.org/ag/aga/frg/feedback/war/v6200b/v6200b0t. htm, Sep. 13, 1994, 5 pages.

(56) References Cited

OTHER PUBLICATIONS

Bayatkouhsar, et al., "Effects of supplementation of lactic acid bacteria on growth performance, blood metabolites and fecal coliform and lactobacilli of young dairy calves", Animal Feed Science and Technology, vol. 186, Issues 1-2, Nov. 15, 2013, pp. 1-11.
Better Crops, "Phosphorus in Animal Nutrition", Better Crops; vol. 83. No. 1, 1999, pp. 32-33.
Bovine Alliance On Managem., & Nutrition , "A Guide to Calf Milk Replacers—Types, Use and Quality", 2008, 4 pages.
Broadway, et al., "The Effects of the Dfm Clostat (R) adn Experimental *Salmonella* Challenge on the Microbiome of the Ileum in Weaned Holstein Steer Calves", Journal of Animal Science, 96 (suppl): 41-42, Mar. 1, 2018,.
Calf Sessions, "The Science of Mixing Milk Replacer", http://calfsessions.com/2013/06/science-mixing-milk-replacer-rnixology-101/, 2013, 5 pages.
Campbell, et al., "The use of lactoperoxidase for the bleaching of fluid whey", Journal of Dairy Science, 2012, 95.6 pp. 2882-2890.
Connor, "α-Linolenic acid in health and disease", Am. J Clin. Nutr; vol. 69, 1999, pp. 827-828.
Costello, "Milk Extenders and Fortifiers—with downloadable calculator", Available online at www.calfsessions.com, Jan. 2015, 2 pages.
Coverdale, et al., "Effect of Various Levels of Forage and Form of Diet on Rumen Development and Growth in Calves", J. Dairy Sci.; vol. 87, 2004, pp. 2554-2562.
Crews, et al., "Journal of Animal Science", Animal Genetics: Division Editor Cell Biology S. Ellis Associate Editor Growth and Developmental Biology S. Johnson Calvert Associate Editor M. Estienne Associate Editor J. Matte Associate Editor J. O'Doherty, XP055426140,, Retrieved from the Internet: URL:http://www.jtmtg.org/JAM/2012/abstracts/2012-JAMAbstracts.pdf [retrieved on Nov. 17, 2017], Jan. 1, 2012, p. 116.
Crowder, "The Effect of Medium Chain Fatty Acids on Porcine Reproductive and Respiratory Syndrome Virus", dissertation, May 2021, 149 pages, Purdue University, department of Animal Sciences, West Lafayette, Indiana.
Database Caplus [Online], Chemical Abstracts Service, Columbus, Ohio, US; 2014, XP002791790, database accession No. 2015:1332789, Liu, J. et al.: "Effects of Bacillus subtilis (PB6 strain) additive on reproduction of weaning piglet," Xumu Yu Shouyi, vol. 46, No. 2, pp. 37-39, 2014.
De Halleux, et al., "Variability in human milk composition: benefit of individualized fortification in very-low-birth-weight infants", The American Jrnl of Clinical Nutrition; vol. 98 (Suppl), 2013, pp. 529S-535S.
De Rodas, et al., "Microbiome Profiling of Commercial Pigs from Farrow to Finish", American Society of Animal Sciences, vol. 96, pp. 1778-1794, 2018, Oxford University Press.
Dimova, et al., "Effect of supplementation of probiotic zoovit in diets of calves of milk breed", Bulgarian Journal of Agricultural Science, 19 (Supplement 1), Jan. 2013, 94-97.
Drackley, "Replacing Milk-Derived Proteins and Carbohydrates in Milk Replacer", University of Illinois at Urbana-Champaign, Department of Animal Sciences, May 29, 2013, 8 pages.
Dumitrascu, et al., "Thermal Inactivation of Lactoperoxidase in Goat, Sheep and Bovine Milk—A Comparative Kinetic and Thermodynamic Study", Journal of Food Engineering, 2012, vol. 113 pp. 47-52.
Echternkamp, "Relationship between placental development and calf birth weight in beef cattle", Animal Reproduction Science, 32: 1-13, 1993.
Elizondo-Salazar, et al., "Pasteurization of Non-Saleable Milk", Penn State Extension, Department of Animal Science, DSE 2013-187, originally published as DAS 07-121, updated on Aug. 23, 2013, May 2007, 10 pages.
EPO, "European Office Action", Application No. EP13731012.4, Nov. 22, 2017, 6 pages.
EPO, "Extended European Search Report", Application No. 17161383.9, May 2, 2017, 35 pages.
EPO, "Extended European Search Report", Patent Application No. 15159436.3, Jun. 26, 2015, 9 pages.
EURASYP, "Yeast Cell Wall", European Association for Specialty Yeast Products, Nov. 5, 2015, 1 page.
Euro Food Safety Auth., "Scientific opinion on the safety and efficacy of RonozymeHiPhos M/L (6-phytase) as a feed additive for poultry and pigs", EFSA Journal; 10(1):2527, 2012, 12 pages.
Fao Animal Production and Health, "Rearing Young Ruminants on Milk Replacers and Starter Feeds", 2011, 1-79.
Fathi, et al., "The effect of vanilla flavoured calf starter on performance of Holstein calves", Jrnl. of Animal and Feed Sci.; Vo. 18, 2009, pp. 412-419.
Frizzo, et al., "Effects of probiotics on growth performance in young calves: A meta-analysis of randomized controlled trials", Animal Feed Science and Technology 169, 2011, 147-156.
Frizzo, et al., "Lactic acid bacteria to improve growth performance in young calves fed milk replacer and spray-dried whey powder", Animal Feed Science and Technology 157 (2010) 159-167.
Frontline, "Use of the Brix Refractometer for Monitoring Milk Total Solids and Colostrum Quality", www.rnilkproductsinc.com; Accessed on Dec. 5, 2011, 2011, 1 page.
Godden, "A review of issues surrounding the feeding of waste milk and pasteurization of waste milk and colostrum", College of Veterinary Medicine, University of Minnesota, Sep. 2005, 13 pages.
Gouveia, et al., "Action of phosphorylated mannanoligosaccharides on immune and hematological responses and fecal consistency of dogs experimentally infected with enteropathogenic *Escherichia coli* strains", Brazilian Jrnl. of Microbiology; vol. 44 No. 2, 2013, pp. 499-504.
Griffiths, "Improving the Safety and Quality of Milk: Milk Production and Processing Woodhead Publishing Series in Food ScienceTechnology and Nutrition", Apr. 21, 2010, 295 pages.
Heinrichs, et al., "Effects of Mannan Oligosaccharide or Antibiotics in Neonata Diets On Health and Growth of Dairy Calves", Jrnl. of Dairy Sci.; vol. 86 No. 12, Dec. 2003, pp. 4064-4069.
Hill, et al., "Effects of Milk Replacer Composition on Growth, Body Composition, and Nutrient Excretion in Preweaned Holstein Heifers", Jrnl. of Dairy Sci., Amer. Dairy Sci. Assoc.; vol. 91 No. 8, Aug. 1, 2008, pp. 3145-3155.
Hu, et al., "Effects of intrauterine growth retardation and Bacillus subtilisPB6 supplementation on growth performance, intestinal development and immune function of piglets during the suckling period", European Journal of Nutrition, Steinkopff Verlag, Darmstadt, DE, 56(4): 1753-1765, May 17, 2016,.
Industries Kemin, "Clostat(R) product specification", Retrieved from the Internet: URL:https://www.kemin.com/content/dam/images/CLOSTAT%20Dry%20Spec%20Sheet.pdf [retrieved on Jun. 2019], Jan. 1, 2017.
Jackett, et al., "Virulence of *Mycobacterium tuberculosis* and Susceptibility to Peroxidative Killing Systems", Journal of General Microbiology; vol. 107 No. 2, pp. 273-278.
Jatkauskas, et al., "Effects of a Combined Pre- and Probiotics Product on Diarrhoea Patterns and Performance of Early Weaned Calves", ISSN 1392-2130. Veterinarija Ir Zootechnika (Vet Med Zoot). T. 48 (70). 2009, 17-23.
Jatkauskas, et al., "Effects of Encapsulated Probiotic Enterococcus Faeciumstrain on", ISSN 1392-2130. Veterinarija Ir Zootechnika (Vet Med Zoot). T. 67 (89), 2014, 47-52.
Jorgensen, M et al., "On-Farm Pasteurization of Milk for Calves", University of Wisconsin Dail) Update, Dail) Team Extension, Mar. 31, 2005, pp. 1-3.
Kemin North America, "Clostat® Product Sheet", downloaded from https://www.kemin.com/en/north-america/products/clostat on Feb. 15, 2018, 7 pages.
Land O'Lakes, "Pasteurized Milk Balancer", https://s3.amazonaws.com, 2009, 1 page.
Langendijk, et al., "Effects of pre- and postnatal exposure to garlic and aniseed flavour on pre- and postweaning feed intake in pigs", Livestock Science, Elsevier Amsterdam, NL; vol. 108 No. 1-3, Apr. 29, 2007, pp. 284-287.
Mexican Institute of IP, "Mexican Patent Examination Report", Patent Application No. MX/a/2012/010741, Mar. 6, 2015, 16 pages.

(56) References Cited

OTHER PUBLICATIONS

MIA-A, "Milk Analyzer Operation Manual", https://www.mrclab.com/data/products/MIA-S-30_OPR.pdf, 2005, 100 pages.
Milk Specialties Global, Naimal Nutrition , "New Dairy Calf Production Products that can Increase Your Profit", PM Primer™, PM Balancer™ downloaded from www.progressivedairy.com on Mar. 5, 2015., 1 page.
Mitsuru, et al., "Effects of feeding level of milk replacer on body growth, plasma metabolite and insulin concentrations, and visceral organ growth of suckling calves", Anim. Sci. Jrnl. XP055194192, ISSN: 1344-3941, DOI: 10.1111/j.1740-0929.2009.00690.x; vol. 80 No. 6, Dec. 2009, pp. 662-668.
Montoro, et al., "Effect of flavoring a starter in a same manner as a milk replacer on intake and performance of calves", Animal Feed Sci. and Technol.; vol. 164, Feb. 28, 2011, pp. 130-134.
Moore, et al., "Quality assessments of waste milk at a calf ranch", J. Dairy Sci; vol. 92, 2009, pp. 3503-3509.
Mullan, "Manufacture of milk powders containing a functional LP system", [Online]. Available from: htt.Q://www.dairyscience.info/exploitation-of-ant-microbial-proteins/168-lactoperoxidase-system.html. Accessed: Jan. 10, 2014. Revised Aug. 2009., 2003, 4 pages.
Nabte-Solfs, "Effect of 13-MANNANASE Enzyme Addition to Soy-Containing Milk Replacers on Growth and Health of Neonatal Dairy Calves", Thesis Presented to the Faculty of the Graduate School of Cornell University, Jan. 2009, 105 pages.
Oostindjer, et al., "Prenatal flavor exposure affects growth, health and behavior of newly weaned piglets", Physiology and Behavior, Elsevier Science Ltd., Oxford, GB,; vol. 99 No. 5, Apr. 19, 2010, pp. 579-586.
PCT, "International Search Report and Written Opinion", Application No. PCT/US2016/019848, May 12, 2016, 10 pages.
PCT, "International Search Report and Written Opinion", Application No. PCT/US2016/021789, Jun. 3, 2016, 10 pages.
PCT, "International Search Report and Written Opinion", Application No. PCT/US2016/067683, Mar. 22, 2017, 8 pages.
PCT, "International Search Report and Written Opinion", Application No. PCT/US2015/038612, Sep. 23, 2015, 8 pages.
Pinchuk, et al., "In Vitro Anti-Helicobacter pylori Activity of the Probiotic Strain Bacillus subtilis 3 Is Due to Secretion of Antibiotics", Antimicrobial Agents and Chemotherapy, Nov. 2001, p. 3156-3161, vol. 45, No. 11.
Pruitt, et al., "Quantitative analysis of bovine lactoperoxidase system components and of tile effects of the activated system on bacterial growth and survival", Indigenous antimicrobial agents of milk. Recent developments, Uppsala (Sweden) Aug. 31-'!Sep. 1993, FIL-IDF. Secretariat general, 1994, pp. 73-87.
Riley, et al., "Penetration of hydrogen peroxide from contact lenses or tear-side solution into the aqueous humor", Optom Vis Sci.; vol. 68 No. 7, 1991, pp. 546-551.
Rochow, et al., "Target Fortification of Breast Milk with Fat, Protein, and Carbohydrates for Preterrm Infants", The Journal of Pediatrics; vol. 163 No. 4, 2013, pp. 001-1007.
Rudolph, "Phytase use in pig feed: a real profitability boost", All About Feed; vol. 22 No. 8, 2014, pp. 22-24.
Russell, et al., "Naturally Occurring Antimicrobial Systems", Food Preservatives 2nd Ed. ISBN 0-306-47736-X, 2003, pp. 277a-277b.
Sav-A-Caf Products, "K-Cal for Calves Energy Supplement", https://www.savacaf.com/products/k-cal-for-calves-energy-supplement/, 2007, 5 pages.
Sebastian, et al., "Apparent Digestibility of Protein and Amino Acids in Broiler Chickens Fed a Com-Soybean Diet Supplemented with Microbial Phytase", Dep. of Anim. Sci., Macdonald Campus of McGill University; vol. 76 No. 12, 1997, pp. 1760-1769.
Selia, et al., "Engineering Aspects of Milk and Dariy Products", CRC Press, 2010, pp. 222.
Siemens, et al., "Managing and feeding Holstein steers: birth to 350 lbs", US Dept. of Agriculture, Univ. of Wisconsin-Extension. Publ. A3662. Board of Regents of the Univ. of Wisconsin System, 1996, pp. 1-6.
Signorini, et al., "Impact of probiotic administration on the health and fecal microbiota of young calves: A meta-analysis of randomized controlled trials of lactic acid bacteria", Research in Veterinary Science 93, 2012, 250-258.
Smith, et al., "The Effect of Mannan Oligosaccharide Supplementation on Body Weight Gain and Fat Accrual in C57Bl/6J Mice", Obesity (Silver Spring), doi:10.1038/oby.2009.308: vol. 18 No. 5, May 2010, pp. 995-999.
Soca, et al., "Effect of the Sorbial® probiotic on the productive performance and health of grazing calves", Pastos y Forrajes vol. 34 No. 4 Matanzas sep.-dic. 2011.
Sorokulova, et al., "Probiotics against Campylobacter Pathogens", Journal of Travel Medicine, vol. 4, No. 4, 1997, 167-170.
Stone, "Waste milk, milk replacer or pasteurized waste milk", The Manager, Jun. 2004, 3 pages.
Tomkins, et al., "Milk replacer research leads to new developments", Feedstuffs, Oct. 10, 1994, pp. 13-15 and 23.
Touchette, et al., "Liquid Egg as an Alternative Protein Source in Calf Milk Replacers", J. Dairy Sci.; vol. 86, 2003, pp. 2622-2628.
Mllarroel, "Scours in Beef Calves: Causes and Treatments", EM 8977-E, 5 pages, Apr. 2009, Oregon State University, retrieved from https://catalog.extension.oregonstate.edu/em8977.,.
Yang, et al., "Study on the Colostrum Preservation of Milk Cows by Utilizing the Lactoperoxidase System", Guizhou Agricultural Sciences, accessed Dec. 28, 2013., May 2007, 1 page.
Zhang, et al., "Effect of oral administration of probiotics on growth performance, apparent nutrient digestibility and stress-related indicators in Holstein calves", Journal of Animal Physiology and Animal Nutrition, vol. 100 (1) p. 33-38, Feb. 2016.
Extended European Search Report issued in European patent application No. 21904374.2, mailed on Oct. 22, 2024, 11 pages.
Anderson , "Pet Rodents", Saunders Manual of Small Animal Practice, Chapter 177, pp. 1881-1909, Jan. 1, 2006, Elsevier.
Barbosa, et al., "Screening for Bacillus Isolates in the Broiler Gastrointestinal Tract", Applied and Environmental Microbiology, vol. 71, No. 2, Feb. 1, 2005, pp. 968-978, American Society for Microbiology.
Ben Lagha , et al., "Antimicrobial Potential of Bacteriocins in Poultry and Swine Production", Veterinary Research, vol. 48, No. 1, Apr. 11, 2017.
Brugaletta, et al., "Effects of Alternative Administration Programs of a Synbiotic Supplement on Broiler Performance, Foot Pad Dermatitis, Caecal Microbiota, and Blood Metabolites", Animals, vol. 10, No. 3, 18 pages, Mar. 20, 2020.
Ferket , et al., "Nutrition and Gut Health of Turkeys and Broilers", Jan. 1, 2015, retrieved from https://www.researchgate.net/publication/285908938_Nutrition_and_gut_health_of_turkeys_and_broilers.
From , et al., "Food Poisoning Associated with Pumilacidin-Producing", International Journal of Food Microbiology, vol. 115, No. 3, pp. 319-324, Mar. 16, 2007.
Pudova, et al., "Effect of Bacillus Pumilus 3-19 Protease on Growth Parameters and Gut Microbiome of Broiler Chickens", E3S Web of Conferences, vol. 222, 8 pages, Jan. 1, 2020.
Ramlucken , et al., "A Novel Bacillus Based Multi-Strain Probiotic Improves Growth Performance and Intestinal Properties of Clostricium Perfringens Challenged Broilers", Poultry Science, vol. 99, No. 1, Jan. 1, 2020, pp. 331-341.
Saggese , et al., "A Marine Isolate of Bacillus Pumilus Secretes a Pumilacidin Active Against *Staphylococcus aureus*", Marine Drugs, vol. 16, No. 6, 13 pages, May 24, 2018.
Sato , et al., "Staphylococcosis in Poultry", MSD Manual Veterinary Manual, 12 pages, Jan. 1, 2020, retrieved from https://www.msdvetmanual.com/poultry/staphylococcosis/staphylococcosis-in-poultry.
Tilley , et al., "Litter and Commercial Turkey Strain Influence on Focal Ulcerative Dermatitis ("Breast Buttons")", Journal of Applied Poultry Research, vol. 5, No. 1, Mar. 1, 1996, pp. 39-50.
Chilean Patent Examination Report, issued by the National Institute of IP for Patent Application No. 2556-2012, issued on Feb. 11, 2015, 16 pages including 8 pages of English translation.

(56) References Cited

OTHER PUBLICATIONS

Dairy Business East, "Milk Balancer Can Help When Feeding Wasting Milk", www.dairybusiness.com, Feb. 2015, p. 12.

* cited by examiner

FEED COMPOSITIONS AND METHODS FOR INHIBITING FOCAL ULCERATIVE DERMATITIS

CROSS REFERENCE TO RELATED APPLICATIONS

This application claims priority to U.S. Provisional Application No. 63/123,288, filed Dec. 9, 2020, entitled "FEED COMPOSITIONS AND METHODS FOR INHIBITING FOCAL ULCERATIVE DERMATITIS" which is incorporated by reference herein, in its entirety and for all purposes.

TECHNICAL FIELD

The present disclosure relates to compositions and methods of inhibiting focal ulcerative dermatitis in animals. Particular implementations provide feed products containing a direct-fed microbial composition, along with associated methods of feeding that prevent and treat focal ulcerative dermatitis in poultry.

BACKGROUND

Focal ulcerative dermatitis (FUD) is a prevalent, fast-spreading ailment among livestock animals, especially poultry, that causes severe health effects often culminating in premature death. Common symptoms of FUD include skin and muscle necrosis, as well as reduced egg production in layer hens. Each of these effects has significantly impeded commercial poultry operations, but despite its prevalence, FUD has largely evaded safe, effective treatments. Likely explanations for this may stem from the diversity of the condition's bacterial etiology, exacerbated by the FUD-friendly conditions in which susceptible animals are maintained. In particular, FUD is commonly associated with multiple strains of Staphylococci capable of spreading rapidly in commercial poultry facilities, many of which are known to produce exfoliative toxins that are epidermolytic and dermonecrotic. A predisposing factor in most infective outbreaks is immunosuppression and the orofecal transmission of the causative bacteria present in the gastrointestinal tract of the infected animals.

The rising popularity of cage-free egg production has led to increases in FUD outbreaks in layer hens. Traditional methods of combating bacteria in layer hens and other poultry has traditionally involved employing various antibiotics; however, challenges with antibiotic resistance and negative public perceptions of antibiotic use are making FUD more difficult to address. New approaches are needed.

SUMMARY

The disclosed feed compositions and associated methods may effectively reduce the infective level of *Staphylococcus* in poultry diagnosed with FUD or predisposed to FUD contraction, thereby preventing or reversing the negative effects of the disease.

In accordance with some examples of the present disclosure, a method of inhibiting focal ulcerative dermatitis in poultry involves feeding the poultry a feed product comprising a base feed and a direct-fed microbial composition in an amount effective to inhibit focal ulcerative dermatitis. In some embodiments, the direct-fed microbial composition includes one or more strains of *Bacillus pumilus*. In some embodiments, the one or more strains of *Bacillus pumilus* comprise two strains included in approximately equal amounts. In some embodiments, the direct-fed microbial composition is fed to the poultry on a daily basis starting at a laying phase, which may begin when the poultry are between about 18 and about 22 weeks old. In some embodiments, the direct-fed microbial composition is fed to the poultry on a daily basis during a period beginning at about hatching and spanning through a laying phase. In some embodiments, the poultry include cage-free poultry. In some embodiments, the poultry include layer hens, broiler chickens, turkeys, ducks, or a combination thereof. In some embodiments, inhibiting focal ulcerative dermatitis comprises preventing focal ulcerative dermatitis or alleviating one or more symptoms of focal ulcerative dermatitis. In some embodiments, the poultry exhibit improved performance comprising increased egg production relative to poultry fed the same base feed but lacking the direct-fed microbial composition. In some embodiments, the feed product excludes antibiotics.

In accordance with some examples of the present disclosure, a method of feeding cage-free poultry involves feeding the cage-free poultry a feed composition comprising a direct-fed microbial composition containing one or more strains of *Bacillus pumilus*. In some embodiments, feeding the cage-free poultry prevents focal ulcerative dermatitis from developing in the cage-free poultry, reduces one or more symptoms of focal ulcerative dermatitis exhibited by the cage-free poultry, or both. In some embodiments, the method further involves forming the feed composition by admixing the direct-fed microbial composition with a base feed. In some embodiments, the direct-fed microbial composition is admixed with the base feed at an inclusion rate ranging from about 25,000 CFUs per gram of base feed to about 10 million CFUs per gram of base feed. In some embodiments, the base feed includes a complete poultry feed. In some embodiments, the cage-free poultry include layer hens of at least 16 weeks of age.

In accordance with some examples of the present disclosure, a feed product for cage-free poultry includes a complete base feed and a direct-fed microbial composition that includes one or more strains of *Bacillus pumilus*. The feed product can exclude antibiotics in some embodiments. In some examples, the one or more strains of *Bacillus pumilus* comprise approximately equal amounts of two strains of *Bacillus pumilus*. In some embodiments, the cage-free poultry include layer hens diagnosed with focal ulcerative dermatitis.

DETAILED DESCRIPTION

Figure 1:
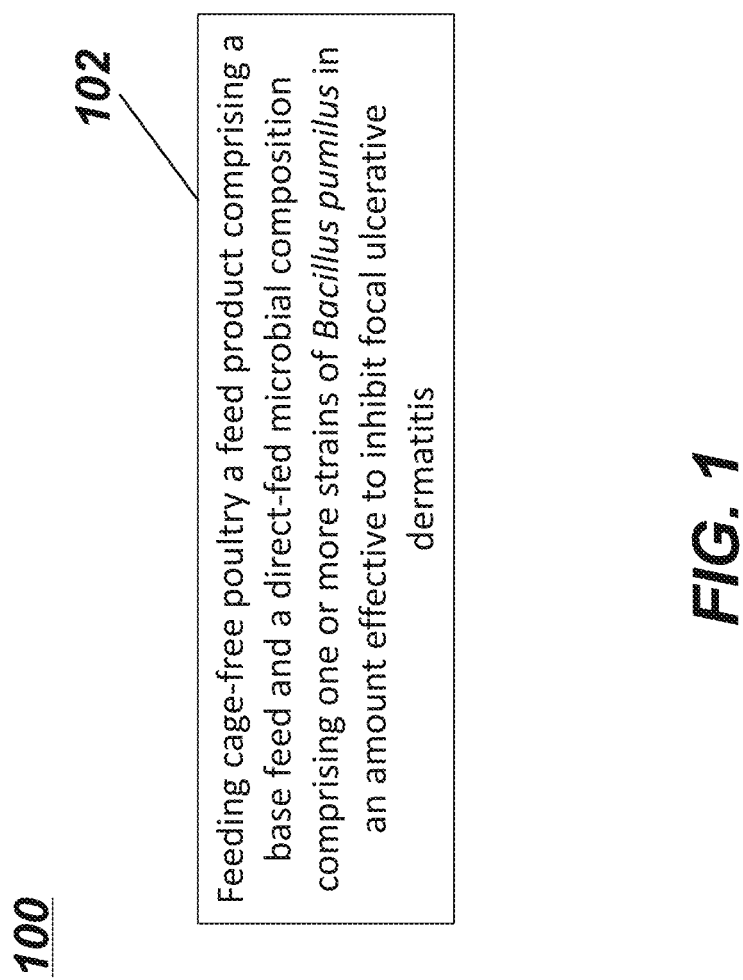
FIG. 1 is a method of inhibiting FUD implemented according to embodiments of the present disclosure.

Implementations provide methods of inhibiting FUD in animals by feeding the animals a feed product containing direct-fed microbials (DFMs), which are live microorganisms. The feed product can comprise a base feed mixed with a DFM composition, which may include at least one strain of *Bacillus pumilus*. The animals fed the feed products disclosed herein can include various poultry species, e.g., layer hens, turkeys or broiler chickens, which can be fed the products before or after the animals exhibit symptoms of FUD. Embodiments may be particularly suited for poultry raised and/or maintained in cage-free environments. By not relying on the use of harmful chemicals and antibiotics, the disclosed feed products and associated methods provide safe, natural alternatives to preexisting approaches of inhibiting FUD. Embodiments may also be more effective than traditional methods of FUD inhibition, evidenced by the significant reduction in *Staphylococcus* levels measured in the skin microbiome of FUD-positive poultry upon implementation of the disclosed methods and the improvements in animal performance that may be achieved as a result.

Animals fed the feed products disclosed herein may include various poultry species, which may be raised for commercial egg and/or meat production. As used herein, "poultry" thus refers to birds raised and kept for the purpose of collecting their eggs, or raised for their meat and/or feathers. Non-limiting examples of such birds may include various breeds of layer hens, broiler chickens, turkeys, geese, or ducks. In some examples, FUD may not be inhibited in one or more of the aforementioned poultry species according to the methods herein. For example, the disclosed feed products may be formulated to be specifically effective against one or more strains of Staphylococci, which may be present only in layer hens or other poultry. The disclosed methods may apply to commercial poultry operations, small to moderately sized poultry farms, or backyard chicken coops. Embodiments may also be effective in treating swine, which may be suffering from a *Staphylococcus* infection called "greasy pig." Solely for ease of illustration, this disclosure refers to "poultry" as the target animal.

The poultry fed according to the methods described herein can include cage-free poultry. As used herein, "cage-free" poultry may refer to poultry allowed to roam freely within a defined space, such as an enclosed room or building, which may comprise a poultry barn or similar facility. The poultry may have unlimited access to food and water in such facilities, non-limiting examples of which may each contain about 120,000 animals. In some embodiments, the cage-free poultry may not have outdoor access. Cage-free poultry may also be referred to as "free-roaming hens." Cage-free animals may be more susceptible to contracting FUD than caged animals housed in commercial poultry facilities, which typically include conveyor belts positioned underneath wire flooring to remove fecal matter as it is produced. By contrast, fecal matter may be more likely to accumulate in cage-free environments, thereby causing the animals to contact, e.g., walk through, such fecal matter and increase their likelihood of bacterial infection and FUD contraction.

Free-range poultry may also be fed according to the methods described herein. Like cage-free poultry, free-range poultry may also be free to roam and may have unlimited access to food and water; however, free-range poultry may be able to roam partially or entirely outdoors.

The disclosed feed products and associated feeding methods are effective to inhibit FUD, As used herein, "inhibition" may encompass a prevention, reduction or elimination of a *Staphylococcus* infection that causes FUD. For example, as shown and validated upon DFM inclusion in the diet of FUD-positive layer hens fed in accordance with examples of the present disclosure, FUD inhibition may refer to a reduction in the measurable levels of *Staphylococcus* or a decrease in the growth rate of *Staphylococcus* relative to an untreated control. Inhibition may also encompass treatment of FUD evidenced by a reduction in the severity, duration, and/or number of FUD symptoms exhibited by an animal diagnosed with the condition. Inhibition may also include a cure for FUD, or an elimination of one or more FUD symptoms. Inhibition can encompass the prevention of FUD, especially for animals at a heightened risk of contracting it, for example animals not diagnosed with or exhibiting symptoms of FUD, but exposed to *Staphylococcus* and/or maintained in a cage-free poultry facility where the incidence of FUD is moderate or high. The bacterial inhibition achieved by implementing the methods disclosed herein, along with the prophetic variations derived therefrom, were obtained and validated via extensive experimentation conducted both in vitro and in live animals.

Non-limiting examples of *Staphylococcus* species treated according to the methods described herein may include *S. agnetis, S. hyicus, S. aureus*, and *S. simulans*.

As used herein, an "effective amount" refers to an amount capable of providing bioavailable levels of the active components, e.g., one or more strains of *Bacillus pumilus*, sufficient to inhibit FUD.

Based on the feeding methods performed and validated in accordance with this disclosure, direct-fed microbial compositions disclosed herein include pure or substantially pure *Bacillus* isolates proven to inhibit *Staphylococcus* strains identified as causative agents of FUD. As further set forth below, embodiments described herein were developed in part by analyzing the microbiomes of skin, ileum and cecum samples obtained from FUD-positive layer hens and FUD-negative layer hens. Through comprehensive bioinformatic analysis, a complex of infective organisms, dominated by *Staphylococcus agnetis*, was identified and characterized. After characterizing the infectious complex, multiple *Bacillus*-based compositions were screened against the *Staphylococcus* strains isolated from infected poultry. Screening methods included well-diffusion and competitive exclusion assays. Through this approach, a particular two-strain combination of *Bacillus pumilus* was determined to be an effective inhibitor of *Staphylococcus* growth, while other *Bacillus*-based compositions proved ineffective or significantly less effective at inhibiting the bacteria. Accordingly, the specific two-strain combination of *Bacillus pumilus* identified herein may, in at least some examples, be optimized or necessary for effective FUD inhibition relative to other DFM compositions containing different or additional types of bacteria, including other species, combinations, or concentrations of *Bacillus*. In some examples, the same two-strain combination of *Bacillus pumilus* disclosed herein may also be an effective inhibitor of one or more bacterial species selected from genera including but not limited to: *Bordetella, Streptococcus, Salmonella, Listeria, Pseudomonas, Pasteurella*, and/or *Escherichia*.

Feed Products Formulated to Inhibit FUD

Embodiments of the disclosed feed products may include a DFM composition, alone, or a DFM composition admixed with a base feed or feed ingredients and/or drinking water. Accordingly, the DFM compositions disclosed herein may be formed into or obtained as a supplement, additive or premix. As a supplement, a DFM composition may be provided to animals separately from other feeds or feed ingredients. As an additive, a DFM composition may be included within a base feed, e.g., a complete poultry feed, such that the DFM composition constitutes a subcomponent of a broader feed composition. As a premix, a DFM composition may be combined with one or more vitamins or minerals, and the resulting composition may be admixed with a base feed or liquid, such as water. According to such examples, the additive or premix may be admixed with the feed composition at or before the time of feeding. Embodiments may also include DFM compositions formulated specifically for inclusion within water or other liquids offered to the animals. The DFM compositions may provide little to no nutritional benefit beyond FUD inhibition, such that the feed compositions or liquids into which the DFM compositions are added may provide the majority or sole source of nutrients to the target animals.

The DFM compositions disclosed herein may include a single DFM or a blend of two or more DFMs. For example, the DFM compositions can include one or more strains of Bacilli, such as *Bacillus pumilus*, which as shown and validated after implementing embodiments of the present disclosure, are effective *Staphylococcus* inhibitors. In embodiments featuring two or more Bacilli strains, the ratio between them may vary. For example, embodiments may feature approximately equal amounts or concentrations of two distinct strains of *B. pumilus*. Alternative embodiments may feature two strains present ata ratio of about 1:2, 2:3, 1:3, 1:4. 1:5, 1:6, 1:7, 1:8, 1:9, 1:10, or any ratio therebetween.

The strains of *B. pumilus* disclosed herein were newly discovered and isolated while developing embodiments of this disclosure. Two distinct strains proved most effective at inhibiting the Staphylococci driving FUD, which were extracted from skin and fecal samples derived from both infected and non-infected poultry. While each strain of *Bacillus pumilus* may be individually effective to inhibit FUD, a combination of both strains may synergistically inhibit FUD to a greater extent than either strain alone, even if a DFM composition containing only one strain of *Bacillus pumilus* is provided to the target animals at an equal or greater amount than the two-strain DFM composition.

The form of the DFM composition may vary and may depend on whether it is utilized as a supplement, additive, or premix. Embodiments may include a dry DFM composition, e.g., a powder or granular composition. The DFM composition may also be provided as a liquid or mealy paste. Embodiments may also include a dry DFM composition formulated for mixing with one or more liquids at the time of feeding.

The DFM composition may comprise one or more bacterial isolates blended together with one or more additional agents configured to preserve the natural properties of the isolates, enhance the effectiveness of the isolates after ingestion, formulate the isolates for a specifically-timed release, and/or improve the palatability of the isolates to the target animals. Non-limiting examples of such additional agents may include anti-caking agents, flavorants, desiccants, emulsifiers, preservatives, stabilizers, protective coatings, salts, and combinations thereof. The agents may be food safe for the selected animal. The concentration of pure or substantially pure DFMs within the DFM composition may vary. In embodiments, the pure or substantially pure DFMs constitute the primary component by dry weight percentage of the DFM composition, such that the pure or substantially pure DFMs constitute at least about 50 wt %, about 55 wt %, about 60 wt %, about 65 wt %, about 70 wt %, about 75 wt %, about 80 wt %, about 85 wt %, about 90 wt %, about 95 wt %, about 98 wt %, about 99 wt %, or about 100 wt % of the DFM composition.

The DFM composition may be admixed with a base feed or feed ingredients in an amount effective to inhibit FUD in animals fed the resulting mixture. In some examples, the per-animal daily baseline dose of DFMs can be prepared by mixing about 625,000 CFUs of DFMs per gram of base feed. In various embodiments, per-gram base feed concentrations of the DFM composition can range from about 25,000 CFUs to about 10 million CFUs, about 100,000 CFUs to about 1.4 million CFUs, about 200,000 CFUs to about 1.3 million CFUs, about 300,000 CFUs to about 1.2 million CFUs, about 400,000 CFUs to about 1.1 million CFUs, about 500,000 CFUs to about 1.0 million CFUs, about 600,000 CFUs to about 900,000 CFUs, about 700,000 CFUs to about 800,000 CFUs, or any concentration therebetween, for example including about 50,000 CFUs/gram of base feed, about 75,000 CFUs/gram of base feed, about 100,000 CFUs/gram of base feed, about 200,000 CFUs/gram of base feed, about 300,000 CFUs/gram of base feed, about 400,000 CFUs/gram of base feed, about 500,000 CFUs/gram of base feed, about 600,000 CFUs/gram of base feed, about 700,000 CFUs/gram of base feed, about 800,000 CFUs/gram of base feed, about 900,000 CFUs/gram of base feed, about 1.0 million CFUs/gram of base feed, about 1.1 million CFUs/gram of base feed, about 1.2 million CFUs/gram of base feed, about 1.3 million CFUs/gram of base feed, about 1.4 million CFUs/gram of base feed, about 1.5 million CFUs/gram of base feed, or any concentration therebetween.

In some examples, the DFM composition may be admixed with a liquid, such as water, in an amount effective to inhibit FUD in animals fed the resulting solution, suspension or mixture, either alone or in combination with a DFM-supplemented feed composition. According to such examples, the per-milliliter (ml) concentration of the resulting aqueous DFM mixture can range from about 15,000 CFUs to about 10 million CFUs, about 50,000 CFUs to about 9 million CFUs, about 100,000 CFUs to about 8 million CFUs, about 200,000 CFUs to about 7 million CFUs, about 300,000 CFUs to about 6 million CFUs, about 400,000 CFUs to about 5 million CFUs, about 500,000 CFUs to about 5 million CFUs, about 600,000 CFUs to about 4 million CFUs, about 700,000 CFUs to about 3 million CFUs, about 800,000 CFUs to about 2 million CFUs, about 900,000 CFUs to about 1 million CFUs, or any concentration therebetween.

Embodiments of the base feed compositions disclosed herein can comprise a complete poultry feed, which may be grain-based. A portion or a majority of the base feed may comprise corn or corn-based products, wheat or wheat-based products, soybeans or soybean-based products, grain sorghum, barley, or combinations thereof. Specific examples of acceptable base feeds may include at least about 50 wt % grain, a majority of which may consist of corn or corn-based ingredients. Embodiments of acceptable base feeds or feed ingredients can include one or more of: corn grain, corn silage, corn gluten feed, corn germ meal, corn starch, corn byproducts, sorghum silage, sorghum byproducts, wheat grain, wheat silage, wheat bran, red dog wheat, wheat germ, wheat flour, wheat middlings, wheat byproducts, barley grain, barley silage, barley byproducts, oat grain, oat silage, oat byproducts, bakery byproducts, hominy feed, peas, dehydrated alfalfa, brewers grains, distillers grains, malt sprouts, rice, rice bran, rice flour, other rice byproducts, cereal feed, sucrose, lactose, glucose, dextrose, or maltose, or any combination thereof.

The form of the base feed may vary. For example, the base feed may be provided in a meal or crumble or pellet form. In some embodiments, the base feed can also comprise a mash, which may be formulated specifically for chicks.

The total protein level of the base feed may be about 16 wt %, or about 14 wt %, about 15 wt %, about 16 wt %, about 17 wt %, about 18 wt %, about 19 wt %, about 20 wt %, about 21 wt %, about 22 wt %, about 23 wt %, about 24 wt %, or more, or any level of protein therebetween. The base feed may also include varying levels of ash, for example about 16 wt % ash, or about 14 wt %, about 15 wt %, about 16 wt %, about 17 wt %, about 18 wt %, about 19 wt %, about 20 wt %, about 21 wt %, about 22 wt %, about 23 wt %, about 24 wt %, or more, or any level of ash therebetween. Embodiments of the base feed may contain crude fat at a level ranging from about 1 wt % to about 5 wt %, for example about 1.5 wt %, about 2 wt %, about 2.5 wt %, about 3 wt %, about 3.5 wt %, about 4 wt %, about 4.5 wt %, or any level therebetween. Embodiments of the base feed may contain fiber at a level ranging from about 1 wt % to about 10 wt %, for example about 2 wt %, about 3 wt %, about 4 wt %, about 5 wt %, about 6 wt %, about 7 wt %, about 8 wt %, about 9 wt %, or any level therebetween. Embodiments of the base feed may contain one or more amino acids, e.g., lysine, at a level ranging from about 0.1 wt % to about 2 wt %, for example about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, or any level therebetween. Embodiments of the base feed may contain various levels of calcium, which may be greater for compositions formulated for layer hens. In some examples, calcium may be included at a level ranging from about 0.5 wt % to about 6 wt %, for example about 0.75 wt %, about 1 wt %, about 1.25 wt %, about 1.5 wt %, about 1.75 wt %, about 2 wt %, about 2.25 wt %, about 2.5 wt %, about 2.75 wt %, about 3 wt %, about 3.25 wt %, about 3.5 wt %, about 3.75 wt %, about 4 wt %, about 4.25 wt %, about 4.5 wt %, about 4.75 wt %, about 5 wt %, about 5.25 wt %, about 5.5 wt %, about 5.75 wt %, or any level therebetween. Additional vitamins and minerals, such as phosphorus, manganese, sodium, sodium chloride, vitamin A, and/or vitamin E may be present at various levels.

In some examples, the base feed formulation can be different depending on the age of the poultry. For example, hens may be fed a specialized layer feed beginning prior to, or around, the onset of harvestable egg production (or "laying phase"), which may occur at about 18 weeks of age, at which point the poultry may be transferred to a layer facility. The layer feed, e.g., Purina® Layena® Pellets, may contain higher levels of calcium than a base feed offered before egg production, and may be provided throughout the laying phase and until molting or culling. During the span between hatching and the laying phase, hens may be fed a grower or starter feed, which may be the same or similar to the feed offered to other chicks and pullets regardless of whether they are being raised for egg or meat production.

The final feed product, including the DFM composition, may be dry or substantially dry, such that moisture level is zero, or close to zero. In some examples, moisture may be present in the feed product at less than about 5 wt %, such as about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1 wt %, about 1.5 wt %, about 2 wt %, about 2.5 wt %, about 3 wt %, about 3.5 wt %, about 4 wt %, about 4.5 wt %, or any level therebetween.

In some embodiments, the feed product can include, or be offered concurrently with, one or more antibiotics or medicinal components. In such embodiments, the DFM composition and the antibiotic(s) can provide a synergistic effect with respect to FUD inhibition, thereby reducing, eliminating or preventing symptoms of the condition to a greater extent than either the DFM composition or the antibiotic(s), alone. The amount of antibiotics used in combination with the DFM compositions may be reduced relative to approaches where antibiotics are used without the DFM compositions of the present disclosure. Examples may also exclude one or more antibiotics, and may be antibiotic-free.

Methods of Inhibiting FUD

Methods of inhibiting FUD in animals involve feeding the animals an effective amount of a DFM composition disclosed herein, either as a stand-alone composition or as a component of a complete feed product or liquid. Animals fed the disclosed compositions can include various breeds of poultry, for example layer hens, which as shown and validated upon implementing specific embodiments disclosed herein, can include layer hens maintained in cage-free environments. The poultry may be diagnosed with FUD, exhibiting symptoms of FUD, or at risk of contracting FUD, although methods may also be applied to healthy animals that may not be at a notable risk of contracting the condition.

Methods may involve initially forming a DFM composition or simply obtaining it, for example via purchase. As noted above, embodiments may then involve combining the DFM composition with a base feed or liquid at or prior to feeding. Pursuant to such embodiments, an animal producer may purchase, produce or otherwise obtain a base feed lacking a DFM composition disclosed herein. Examples can involve admixing the DFM composition with the base feed on a routine or semi-routine basis, for example once per day, and subsequently offering the DFM-supplemented feed product to the target animals, for example on the day of mixing or the day after mixing. Embodiments may also involve admixing the DFM composition with a base feed and placing the resulting mixture in a self-feeder, which may be configured to supply the target animals with adequate amounts of feed for one or more days or weeks at a time, thereby necessitating less frequent admixing of the DFM composition with the feed. The DFM composition can be admixed with the base feed in any convenient manner that ensures the DFM composition is ultimately ingested by the target animals. For example, the DFM composition may be admixed with feed components during production of a feed product, such as a feed supplement or a premix. The DFM composition may additionally or alternatively be top-dressed over a base feed or feed components, such top-dressing over feed contained within a feeding trough or deposited on a flat surface. In some embodiments, the base feed may contain a disclosed DFM composition, such that the animal producer may simply obtain the final feed product and then provide it directly to the animals. Producers may choose to dilute the DFM-supplemented feed products with one or more additional feed components, e.g., supplemental grains, prior to feeding. The DFM-supplemented feed product can be fed in any form which is suitable for feeding the animals.

The amount of the DFM composition ingested per animal via the DFM-supplemented feed or liquid product may vary and may depend on numerous factors, non-limiting examples of which include the starting concentration of the DFM composition, the concentration of DFMs within the final feed or liquid product, the number of feedings administered per day, the specific breed or species of the target animal, the age and/or size of the target animal, the life stage of the target animal, the concentration of the DFM composition within the final feed product, and/or whether the target animal has been diagnosed with or is exhibiting symptoms of FUD.

Embodiments may involve feeding the animals a DFM-supplemented feed product on an ad libitum basis throughout a feeding period. An ad libitum basis as contemplated herein means that feed product is placed in a feeder or on a suitable surface and the animal eats until it is satisfied such that the feed products described herein are always available to the animal for consumption at free will. In additional embodiments, one or more animals may be fed according to a more controlled feeding regimen, such that one or more defined rations of feed are one or more times per day offered per day, e.g., once daily, twice daily or three times daily. The particular manner in which a feed product containing a DFM composition is fed to the animals is not intended to be limited. Any manner suitable for feeding animals may be satisfactory.

The amount of feed ingested per animal per day can vary, and may depend largely on the age and breed of the animal. Layer pullets, for example, may ingest about 8 to about 20 grams of feed per day at about one week of age, or about 10 grams, 12 grams, 14 grams, 16 grams, 18 grams, or any amount therebetween. Feed consumption rates may increase as each animal ages, such that at about 4 weeks of age, each layer pullet may ingest about 20 grams to about 40 grams of feed per day, or about 22 grams to about 38 grams, about 24 grams to about 36 grams, about 26 grams to about 34 grams, about 28 grams to about 32 grams, or about 30 grams of feed per day. At about 17 weeks of age, each layer pullet may ingest about 60 grams to about 100 grams of feed per day, or about 64 grams to about 96 grams, about 68 grams to about 92 grams, about 72 grams to about 88 grams, about 76 grams to about 84 grams, about 78 grams to about 82 grams, or about 80 grams of feed per day. During the laying phase, which may span from about 19 to about 90 weeks in some embodiments, each layer hen may ingest about 80 grams to about 200 grams, about 100 grams to about 180 grams, about 120 grams to about 160 grams, about 100 grams to about 150 grams, about 110 grams, about 120 grams, about 130 grams, about 140 grams of feed per day, or any amount therebetween.

For broiler chickens and/or turkeys, the daily intake rates may be higher. For example, at about 2 weeks of age, turkeys may ingest feed at a daily rate of about 45 grams to about 85 grams, about 50 grams to about 80 grams, about 55 grams to about 75 grams, about 60 grams to about 70 grams, about 65 grams, or any amount therebetween. At about 8 weeks of age, turkeys may ingest feed at a daily rate of about 160 grams to about 240 grams, about 165 grams to about 235 grams, about 170 grams to about 230 grams, about 175 grams to about 225 grams, about 180 grams to about 220 grams, about 185 grams to about 215 grams, about 190 grams to about 210 grams, about 195 grams to about 205 grams, about 200 grams, or any amount therebetween. At about 10 weeks of age, turkeys may ingest feed at a daily rate of about 185 grams to about 265 grams, about 190 grams to about 260 grams, about 195 grams to about 255 grams, about 200 grams to about 250 grams, about 205 grams to about 245 grams, about 210 grams to about 240 grams, about 215 grams to about 235 grams, about 220 grams to about 230 grams, about 225 grams, about 226 grams, about 227 grams, or any amount therebetween. From the period spanning about 14 to about 18 weeks of age, the turkeys may ingest feed at a daily rate of about 325 grams to about 405 grams, about 330 grams to about 400 grams, about 335 grams to about 395 grams, about 340 grams to about 390 grams, about 345 grams to about 385 grams, about 350 grams to about 380 grams, about 355 grams to about 375 grams, about 360 grams to about 370 grams, about 365 grams, or any amount therebetween.

Poultry may be fed the disclosed compositions at various ages and/or for various lengths of time. For example, the animals may be provided the feed (or liquid) products from about hatching until or through the laying phase (e.g., beginning at about 18 weeks), until or through the molting phase (e.g., beginning at about 80 weeks), and/or until culling. Embodiments may involve feeding the animals over a period encompassing the laying phase, or any sub-period between hatching and the end of egg production. Hens may begin laying eggs as early as about 16 weeks of age, or beginning at about 17 weeks, 18 weeks, 19 weeks or 20 weeks. Hens may also begin laying eggs at any age between about 16 and 32 weeks. The hens may continue laying until they reach about 65, 75, 80, 85 or 90 weeks, or older, or any age therebetween. In some examples, hens may be fed the disclosed compositions until death via slaughter or natural causes. The hens may be slaughtered when their egg production rates drop below a defined threshold, e.g., 65% of their maximum production rate. In some examples, the hens may be slaughtered at about 2 years old, or about 1 year, 1.5 years, 2.5 years, or older, or any age therebetween. In various embodiments, the feeding methods described herein may be applicable to poultry beginning at about hatching or at about 1, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95 weeks of age or older, or any age therebetween.

The duration of the feeding method may also vary, for example ranging from less than about 1 week to about 1 week, or longer, for example about 4, 8, 12, 16, 20, 24, 28, 32, 36, 40, 44, 48, 52 weeks or longer. In accordance with specific embodiments implemented and validated in accordance with the present disclosure, a significant reduction in the abundance of *Staphylococcus* within the skin microbiome of FUD-positive layer hens was observed after only 15 weeks of feeding the animals a base feed containing a disclosed DFM composition containing two strains of *Bacillus pumilus*. Similar antibacterial effects, which included an increase in *Lactobacillus* levels typical of FUD-negative poultry, may be achieved after a similar or shorter period of time. In additional examples, the disclosed feed products may be fed to poultry of any age for any length of time. For example, a particular base feed may be supplemented with a disclosed DFM composition for as long as the base feed is typically provided to the animals.

The amount or concentration of the DFM composition provided to the poultry can remain substantially constant or change over time, for example such that the daily feeding rate and/or DFM inclusion rate may be different for chicks relative to fully-grown laying hens. Embodiments may involve providing poultry with a first amount or concentration of DFMs between hatching and about 18 weeks, after which the poultry are provided with a second, greater amount or concentration of DFMs from about 18 weeks to molting or culling, or any period therebetween. The DFM amount or concentration provided to layer hens may thus be the same or different during a pre-laying, laying, and/or post-molt laying phase.

The disclosed embodiments are not limited to one mechanism or theory of FUD inhibition; however, feeding the disclosed DFM compositions to animals can reduce *Staphylococcus* levels in the animals' gastrointestinal (GI) tract and/or in the skin microbiome of FUD-positive animals. By suppressing *Staphylococcus* in the GI tract, the incidence of FUD-linked necrosis developing on the animals' skin may also decrease. Accumulated *Staphylococcus* suppression in a group of animals can reduce the amount of the bacteria present in the localized environment inhabited by the animals, such as a poultry facility, thereby preventing or further reducing the incidence of FUD. The DFM compositions disclosed herein may become active after ingestion by the target animals, for example upon reaching the animals' GI tract, where the DFM compositions may be activated in the manner necessary to release bacteriocins specific to one or more strains of Staphylococci.

Implementing the feeding methods described herein may effectively combat multiple distinct strains of bacteria implicated in FUD development. For example, two distinct strains of *Bacillus pumilus*, alone and especially in combination, may be effective against multiple species of *Staphylococcus*, as shown and validated by implementing embodiments of the present disclosure. Particular species of *Staphylococcus* impeded via implementation of the disclosed methods may include but are not limited to *S. agnetis, S. hyicus, S. aureus,* and *S. simulans*.

As described herein, implementations may be particularly effective for poultry raised and/or maintained in cage-free environments. In some examples, the poultry include laying hens raised primarily for egg production, but which may be slaughtered for meat production once egg production stops or falls below a defined threshold rate. The disclosed methods may be generally beneficial for poultry susceptible to bacterial infection. Contrary to many common beliefs, susceptibility to infection may actually be greater for animals maintained in cage-free conditions, where fecal matter may accumulate and spread frequently from animal to animal. Susceptibility to infection may also be greater for animals suffering from one or more medical ailments or younger animals with undeveloped immune systems, e.g., chicks.

The feeding methods disclosed herein may improve animal performance by inhibiting FUD. Improved performance may comprise an increase in egg production, a prolonged laying phase, and/or a decrease in mortality rate relative to untreated animals. Improved performance may also comprise a reduction in illness or illness-related symptoms, such as skin lesions, gastrointestinal stress, etc.

FIG. 1 shows an example method of inhibiting FUD in poultry, which may be cage-free. As shown at step 102, the method may involve "feeding cage-free poultry a feed product comprising a base feed and a direct-fed microbial composition comprising one or more strains of *Bacillus pumilus* in an amount effective to inhibit focal ulcerative dermatitis." Methods are not limited to step 102, and may involve one or more additional steps, such as first forming the feed composition by admixing the direct-fed microbial composition with a base feed. In various embodiments, the direct-fed microbial composition can admixed with the base feed at an inclusion rate ranging from about 25,000 CFUs per gram of base feed to about 10 million CFUs per gram of base feed. For liquid compositions containing a DFM composition, the inclusion rate may range from about 15,000 CFUs/ml to about 10 million CFUs/ml. The strains of *Bacillus pumilus* included in the DFM composition can include two strains, which may be included in approximately equal amounts. Inhibiting FUD by implementing a method disclosed herein may encompass preventing FUD or alleviating one or more of its symptoms. Poultry may also exhibit improved performance in the form of increased egg production relative to poultry fed the same base feed or liquid but lacking the direct-fed microbial composition.

The following experimental trial is disclosed for illustrative purposes only. Numerous modifications and variations are within the scope of the present disclosure as will be apparent to those skilled in the art.

Trial 1

This experiment was conducted to identify the most prevalent bacteria present in poultry having FUD relative to poultry not having FUD, and to determine which DFMs are most effective at inhibiting such bacteria.

Trial 1 followed a series of experiments conducted to identify potential bacterial drivers of FUD and evaluate numerous candidates for inhibiting such drivers. In particular, 14 *Bacillus* isolates extracted from soil and swine fecal samples (out of an initial set of over 600 novel *Bacillus* strains) were evaluated via agar diffusion cross-streak assays for potential antagonistic effects against nine bacterial pathogens including *Staphylococcus aureus, E. coli* O157:H7, *Bordetella bronchiseptica, Pasteurella multocida, Listeria monocytogenes, Streptococcus agalactiae, Salmonella Heidelberg, Salmonella Typhimurium,* and *Pseudomonas aeruginosa*. Promising *Bacillus* candidates were then sequenced for species identification and further analysis. Twelve multi-strain *Bacillus* combinations were then tested for antimicrobial inhibition of *Staphylococcus xylosus, Bordetella bronchiseptica, Bordetella petrii, Streptococcus suis, Salmonella Cholerasuis, Listeria innocua, Pseudomonas fluorescens, Pasteurella multocida,* and a set of *E. coli* strains by agar-well diffusion and competitive exclusion assays. From these candidates, a two-strain *Bacillus pumilus* combination was proved to be the most effective in both assays against all bacteria tested. This two-strain *Bacillus pumilus* combination was further evaluated against eight distinct strains of *Staphylococcus* in Trial 1, described below.

For the trial, two sister flocks of cage-free layer hens were utilized: 1) a FUD-negative flock; and 2) a FUD-positive flock. The poultry in the FUD-negative flock had a 1.25% mortality rate and exhibited an egg production rate of 89%. By contrast, the poultry in the FUD-positive flock had an 18% mortality rate and exhibited an egg production rate of only 83%. Twenty birds from each flock were selected at 73 weeks of age, and skin, cloaca, ileum and cecum samples were obtained from each bird. Skin samples were obtained via swabbing. Each sample was then screened for a panel of bacterial pathogens, which included *Staphylococcus*.

Figure 2:
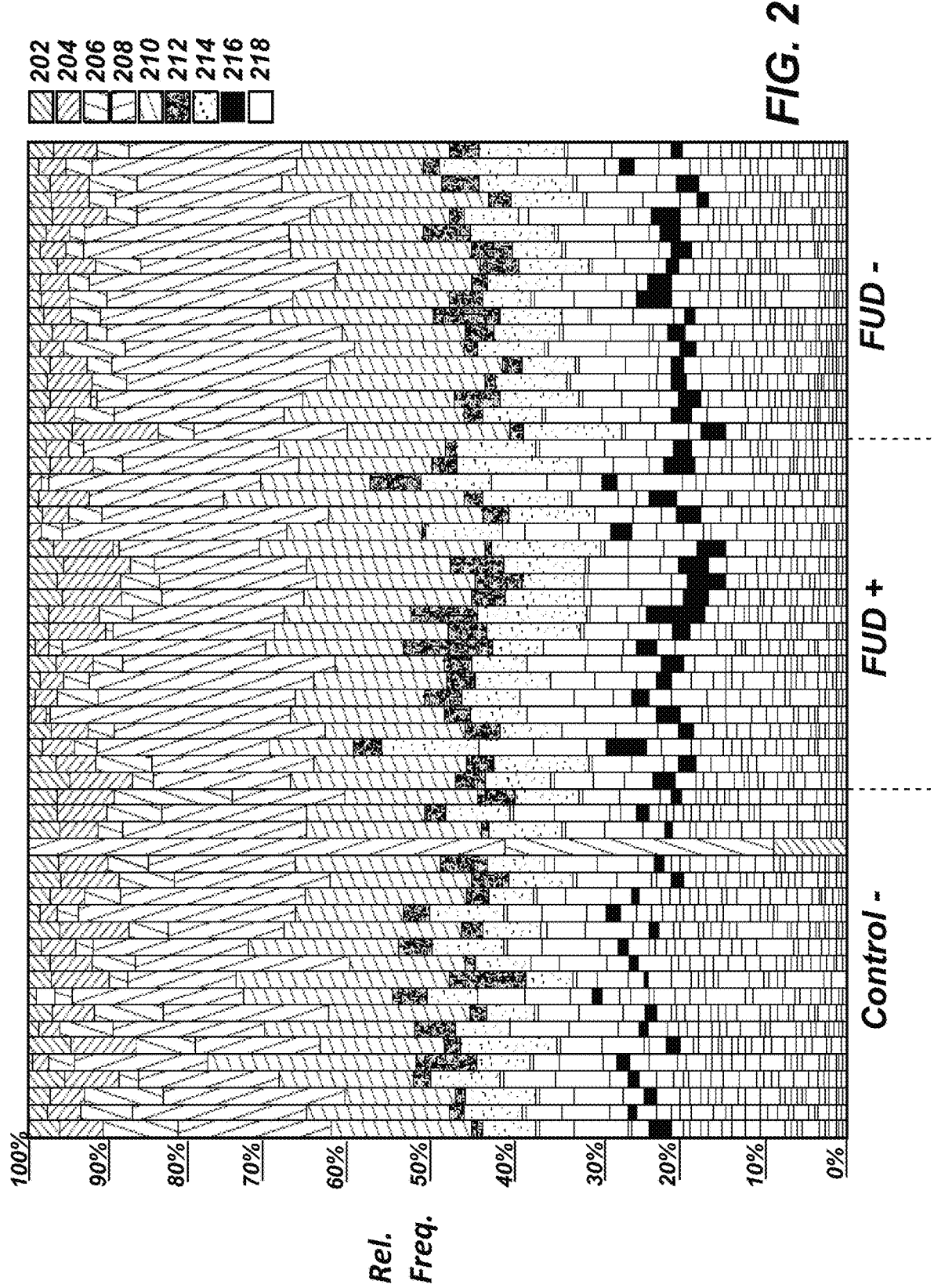
FIG. 2 is a graph showing the relative levels of various bacterial species present within cecum samples derived from FUD-negative and FUD-positive layer hens.
Figure 3:
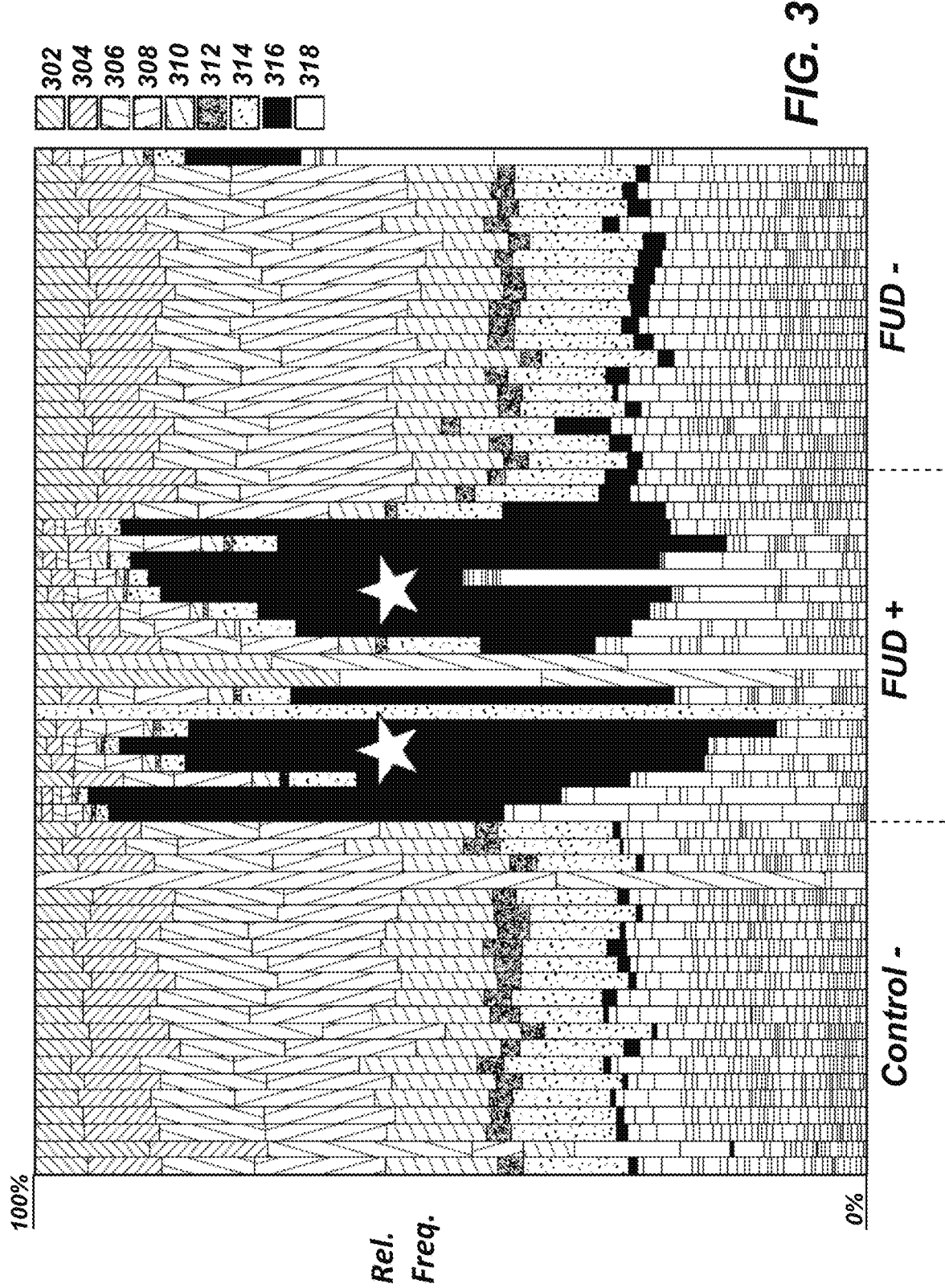
FIG. 3 is a graph showing the relative levels of bacterial species present within skin samples derived from FUD-negative and FUD-positive layer hens.
Figure 4:
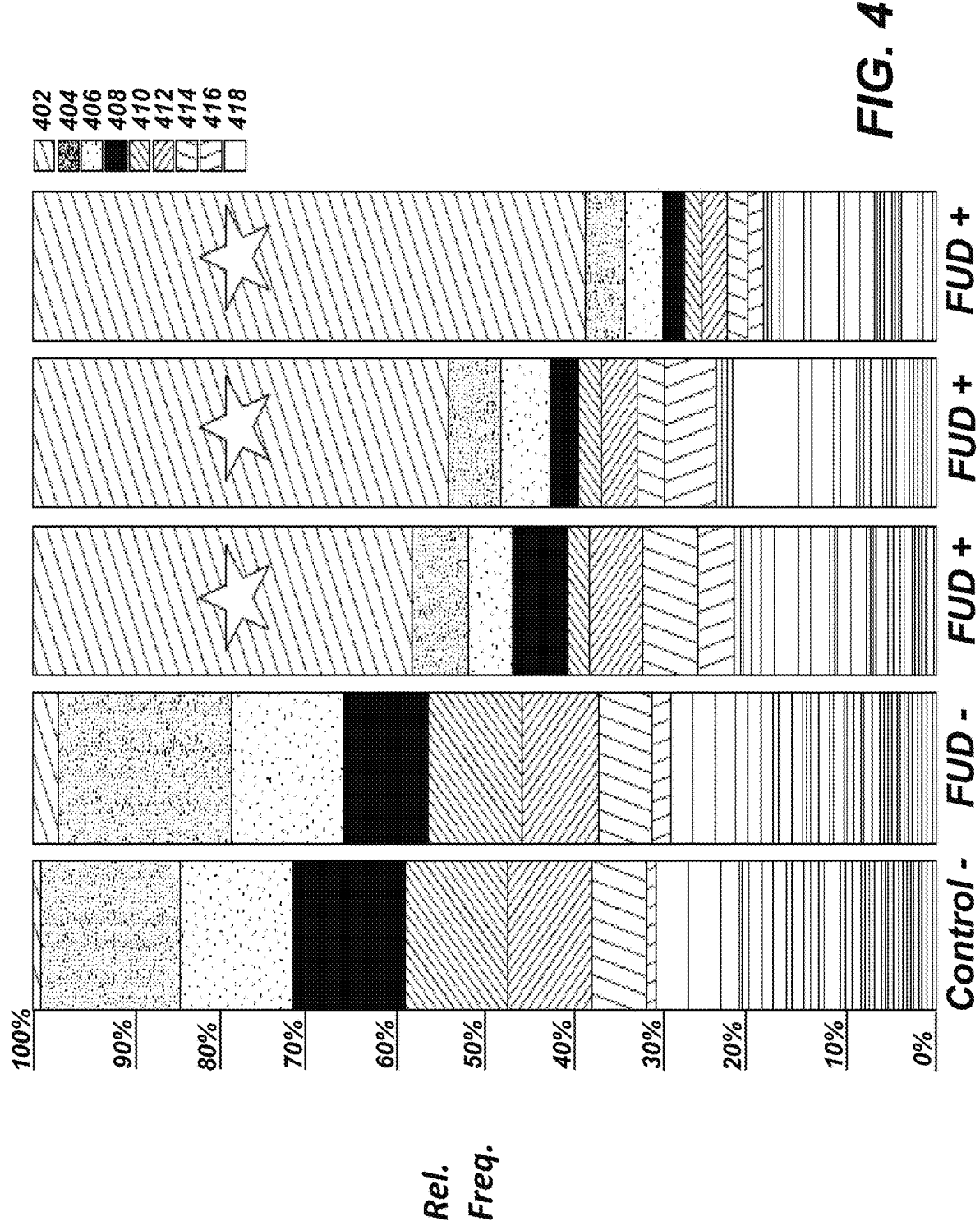
FIG. 4 is a graph showing the relative levels of various bacterial species present within skin lesions derived from FUD-negative and FUD-positive layer hens.

As shown in FIG. 2, which details the relative frequencies of Peptostreptococcaceae 202, Erysipelotrichaceae 204, Lactobacillaceae 206, Ruminococcaceae 208, Bacteroidaceae 210, Fusobacteriaceae 212, Lachnospiraceae 214, Staphylococcaceae 216, and a variety of other bacteria 218 present within the cecum samples, the FUD-positive and FUD-negative birds showed relatively similar levels of many bacteria in the cecum samples, including levels of Staphylococcaceae. By contrast, FIG. 3 shows that skin samples derived from FUD-positive poultry contained significantly higher relative frequency levels of *Staphylococcus* 316 (labeled with a star) compared to the FUD-negative poultry. The increase in relative frequency of *Staphylococcus* within the FUD-positive skin samples was striking in comparison to the relative frequencies of Peptostreptococcaceae 302, Erysipelotrichaceae 304, Lactobacillaceae 306, Ruminococcaceae 308, Bacteroidaceae 310, Fusobacteriaceae 312, Lachnospiraceae 314, and the other bacteria 318. This finding strongly suggested that *Staphylococcus* was the causative pathogen of FUD in the cage-free poultry. The skin lesion scores depicted in FIG. 4 substantiated that finding. In particular, higher lesion scores indicative of greater lesion severity contained much higher levels of *Staphylococcus* 402 (marked with a star) in FUD-positive birds relative to the FUD-negative birds. The relative frequency of Ruminococcaceae 404, Lachnospiraceae 406, Lactobacillaceae 408, Bacteroidaceae 410, Erysipelotrichaceae 412, Peptostreptococcaceae 414, Streptococcaceae 416, and other bacteria 418 are also shown.

Figure 5:
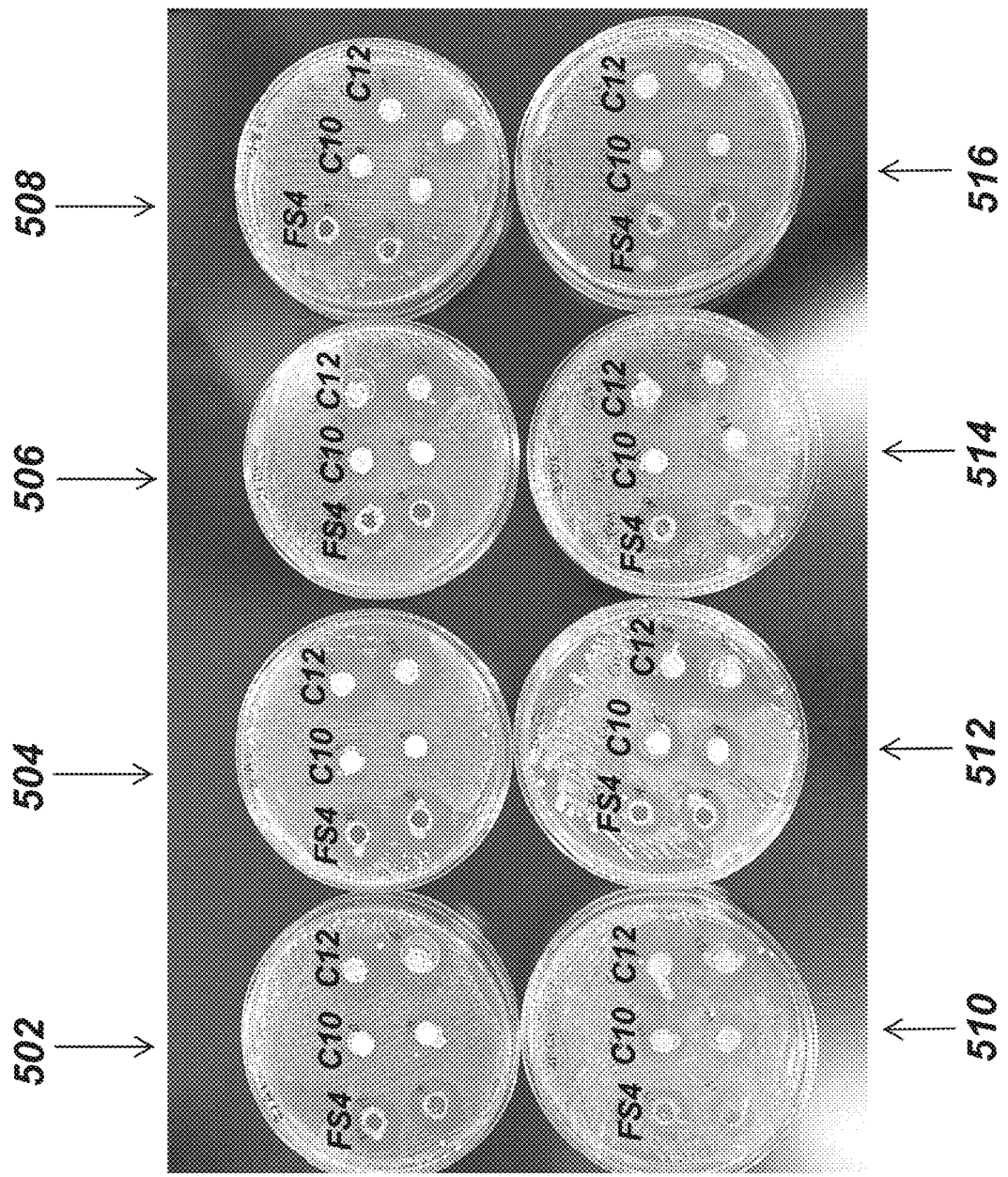
FIG. 5 is a depiction of well-diffusion assay results revealing a DFM composition that most effectively inhibits *Staphylococcus* according to embodiments of the present disclosure.

Based on these results, a well-diffusion assay was conducted in agar plates each streaked with one of eight distinct Staphylococci strains and four distinct DFM compositions. As shown in FIG. 5, each agar plate 502, 504, 506, 508, 510, 512, 514, 516 was covered in one unique strain of *Staphylococcus*, along with separate, localized spots of each DFM composition in replicate. FIG. 5 shows that the zones of inhibition were, on average, the largest for the DFM composition named C12, followed by FS4 and C10. The numerical results are shown below in Table 1.

collected from the FUD-positive birds before and after inclusion of C12 in the animals' diet, and the relative abundance of an assortment of pathogens implicated as causative agents of FUD were measured. Altogether, cecum, ileum, and skin samples were obtained from 10 FUD-positive hens having lesions and 10 FUD-positive hens without lesions. Skin samples were obtained via swabbing, after which the swabs were dispensed into 500 µL of DNA/RNA shield and stored overnight with ice packs. As shown below in Table 2, skin samples collected from the birds before C12 inclusion contained high relative levels of *Staphylococcus* (42% of total flora) and low relative levels of *Lactobacillus* (5% of total flora). Skin samples collected after 15 weeks of providing C12-supplemented feed, by contrast, included much lower relative levels of *Staphylococcus* (3% of total flora) compared to the *Staphylococcus* levels obtained in the initial samples, along with higher relative levels of *Lactobacillus* (17% of total flora), both levels being similar to the abundance of such bacteria typically measured in FUD-negative hens. Accordingly, feeding FUD-positive layer hens a base feed containing C12 decreased the relative abundance of *Staphylococcus* in the skin microbiome of the animals to levels characteristic of

TABLE 1

| | Zone of Inhibition (mm) | | | | | | | | |
| --- | --- | --- | --- | --- | --- | --- | --- | --- | --- |
| | Staph 1 | Staph 2 | Staph 3 | Staph 4 | Staph 5 | Staph 6 | Staph 7 | Staph 8 | Overall Score |
| C12 | 22 | 20 | 25 | 22 | 20 | 21 | 22 | 20 | 172 |
| FS4 | 20.5 | 19 | 14 | 20 | 18 | 16.5 | 16 | 16.5 | 140.5 |
| STD | 15 | 16.5 | 17 | 16.5 | 15 | 14 | 16.5 | 15 | 125.5 |
| C10 | 9 | 11.5 | 14.5 | 10.5 | 5 | 10.5 | 16 | 11 | 88 |

Table 1 shows that the C12 composition, which is comprised of approximately equal amounts of two distinct strains of *Bacillus pumilus*, created a zone of inhibition greater than 20 mm across in each *Staphylococcus* plate, resulting in a combined inhibition score of 172 (calculated by summing all inhibition zone measurements). Given that large inhibition zones are typically characterized by an average zone size of greater than 14 mm, these results indicated that the C12 composition is an effective inhibitor of multiple strains of *Staphylococcus*. The FS4 composition was second-most effective, producing a total inhibition score of 140.5, while STD and C10 compositions came in third- and fourth-most effective. In view of these results, the unique two-strain combination of *Bacillus pumilus* constituting C12 was significantly more effective at inhibiting *Staphylococcus* than the other *Bacillus*-based compositions, indicating that not all *Bacillus*-based DFM compositions may be effective inhibitors, at least not relative to C12.

To determine which particular species of Staphylococci were evaluated, PCR amplification of the 16S rRNA was performed on each *Staphylococcus* isolate, followed by whole genome sequencing. The results showed that Staph. sample 3 and Staph. sample 7 were comprised of *S. agnetis* 12B, and Staph. samples 1, 2, 4, 5, 6 and 8 were comprised of *S. aureus* 14505. Each of these species of *Staphylococcus* may thus be effectively inhibited by a DFM composition comprised of the two-strain combination of *Bacillus pumilus* disclosed herein.

Figure 6:
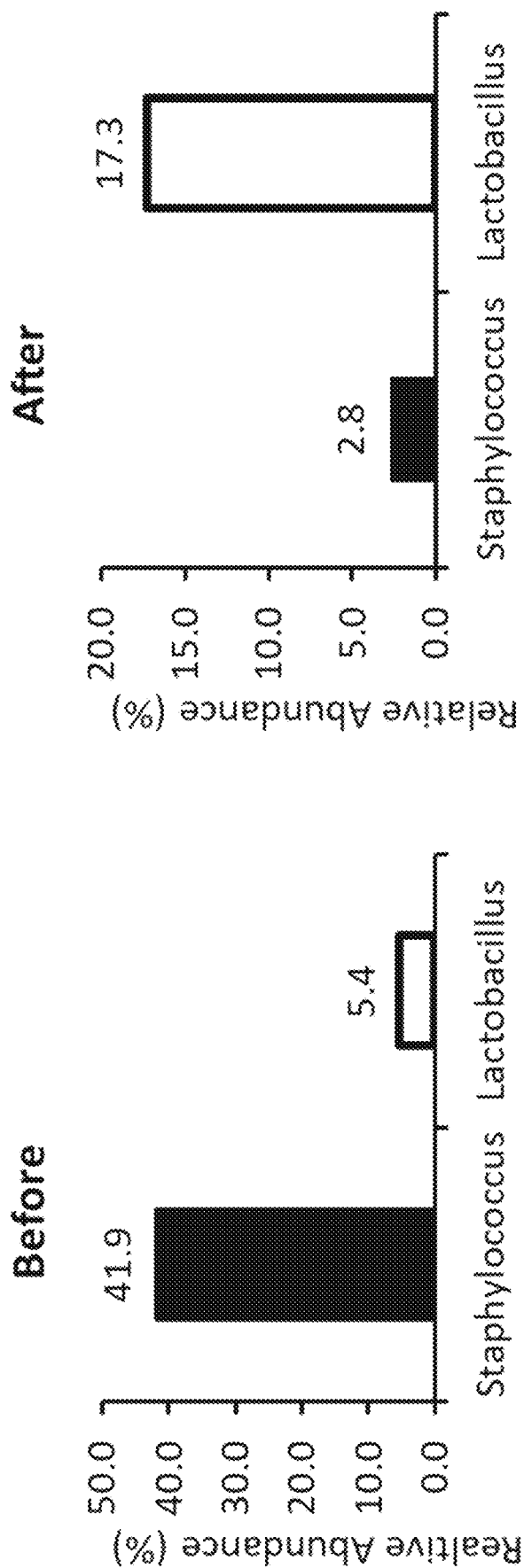
FIG. 6 is a graph showing the relative abundance levels of *Staphylococcus* and *Lactobacillus* measured in skin samples obtained from FUD-positive layer hens before and after feeding the hens a DFM composition in a base feed in accordance with implementations of the present disclosure.

To confirm its antibacterial effectiveness in live animals, the C12 composition was included in a base feed fed to cage-free layer hens afflicted with FUD over a period of 15 weeks. The C12 inclusion rate provided 625,000 CFUs of C12 per gram of base feed. Lesion and skin samples were FUD-negative animals. Due to the strong correlation between elevated *Staphylococcus* levels and FUD discovered through the experimentation described above, the observed reduction in *Staphylococcus* may alleviate or eliminate one or more symptoms exhibited by animals having FUD, such as decreased egg production. Modest increases in the relative abundance of other bacteria, including *Bacteroides*, *Turicibacter*, and *Ruminococcus* were also observed, possibly caused at least in part by the decrease in *Staphylococcus* abundance. Notably, the relative abundance of *Streptococcus* also decreased after 15 weeks of C12 supplementation, a reduction which may strengthen the anti-FUD effects achieved at least in part via *Staphylococcus* inhibition. The significant reduction in *Staphylococcus* abundance and the concomitant increase in *Lactobacillus* abundance are also shown graphically in FIG. 6.

TABLE 2

| | % Abundance | |
| --- | --- | --- |
| Bacterial genus | Before C12 inclusion | After C12 inclusion |
| *Staphylococcus* | 41.9% | 2.8% |
| *Lactobacillus* | 5.4% | 17.3% |
| *Bacteroides* | 2.7% | 10.7% |
| *Turicibacter* | 4.7% | 8.6% |
| *Romboutsia* | 5.1% | 4.7% |
| *Ruminococcus* | 2.2% | 3.8% |
| *Streptococcus* | 3.6% | 1.9% |
| Other | 34.5% | 50.3% |

As used herein, the term "about" modifying, for example, the quantity of a component in a composition, concentration, and ranges thereof, employed in describing the embodiments of the disclosure, refers to variation in the numerical quantity that can occur, for example, through typical measuring and handling procedures used for making compounds, compositions, concentrates, or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment for the purpose of streamlining the disclosure and aiding in the understanding of one or more of the various aspects. These methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

Although the present disclosure provides references to preferred embodiments, persons skilled in the art will recognize that changes may be made in form and detail without departing from the spirit and scope of the invention.

What is claimed is:

1. A method of inhibiting focal ulcerative dermatitis in poultry, the method comprising:
    feeding poultry diagnosed with focal ulcerative dermatitis a feed product comprising a base feed and a direct-fed microbial composition in an amount effective to inhibit focal ulcerative dermatitis,
    wherein the amount effective to inhibit focal ulcerative dermatitis ranges from about 25,000 CFUs per gram of base feed to about 1.5 million Colony Forming Units per gram of base feed, and
    wherein the direct-fed microbial composition comprises two or more distinct strains of *Bacillus pumilus*.

2. The method of claim 1, wherein the two or more distinct strains of *Bacillus pumilus* comprise two strains included in approximately equal amounts.

3. The method of claim 1, wherein the feed product is fed to the poultry on a daily basis starting at a laying phase.

4. The method of claim 3, wherein the laying phase begins when the poultry are between about 18 and about 22 weeks old.

5. The method of claim 1, wherein the feed product is fed to the poultry on a daily basis during a period beginning at about hatching and spanning through a laying phase.

6. The method of claim 1, wherein the poultry comprise cage-free poultry.

7. The method of claim 1, wherein the poultry comprise layer hens, broiler chickens, turkeys, ducks, or a combination thereof.

8. The method of claim 1, wherein inhibiting focal ulcerative dermatitis comprises alleviating one or more symptoms of focal ulcerative dermatitis.

9. The method of claim 1, wherein the poultry exhibit improved performance comprising increased egg production relative to poultry fed the same base feed but lacking the direct-fed microbial composition.

10. The method of claim 1, wherein the feed product excludes antibiotics.

11. A method of feeding cage-free poultry, the method comprising:
    forming a feed composition by admixing a direct-fed microbial composition with a base feed at a direct-fed microbial inclusion rate of about 25,000 CFUs per gram of base feed to about 1.5 million CFUs per gram of base feed, wherein the direct-fed microbial composition contains two or more distinct strains of *Bacillus pumilus;*
    feeding cage-free poultry diagnosed with focal ulcerative dermatitis the feed composition.

12. The method of claim 11, wherein feeding the cage-free poultry reduces one or more symptoms of focal ulcerative dermatitis exhibited by the cage-free poultry.

13. The method of claim 11, wherein the base feed comprises a complete poultry feed formulated to provide at least a majority of nutrients to the cage-free poultry.

14. The method of claim 11, wherein the cage-free poultry comprise layer hens of at least 16 weeks of age.

* * * * *